C. C. HOGEN.
COUPLING.
APPLICATION FILED NOV. 21, 1911.
1,035,793.
Patented Aug. 13, 1912.
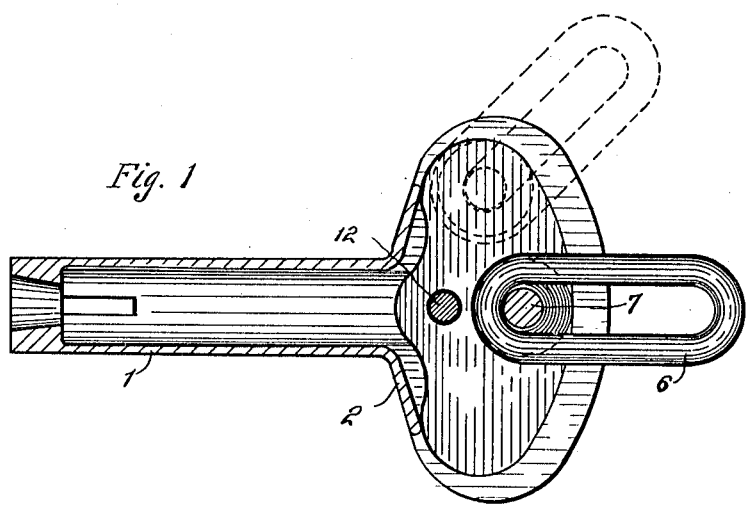
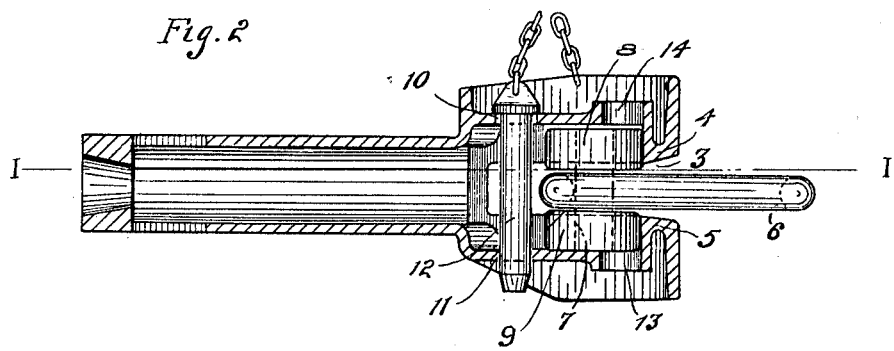
WITNESSES
INVENTOR
Charles C. Hogen
by atty.
Paul Synnestvedt

UNITED STATES PATENT OFFICE.

CHARLES C. HOGEN, OF CLEVELAND, OHIO.

COUPLING.

1,035,793.  Specification of Letters Patent.  Patented Aug. 13, 1912.

Original application filed August 20, 1910, Serial No. 578,166. Divided and this application filed November 21, 1911. Serial No. 661,570.

*To all whom it may concern:*

Be it known that I, CHARLES C. HOGEN, a citizen of the United States, residing at Cleveland, in the county of Cuyahoga and State of Ohio, have invented certain new and useful Improvements in Couplers.

The invention relates to couplers, and particularly to couplers for use with switch engines, the present application constituting a division of my co-pending application, Serial Number 578,166, filed Aug. 20th, 1910. The invention has for its primary objects; the provision of an improved coupler construction approximating in cost the ordinary link and pin coupler, but having a much wider range of movement, thus permitting the use of the coupler without additional links or other devices upon sharp and reverse curves such as are often encountered in switching; the provision of a very simple construction readily assembled in which the number of parts is reduced to a minimum; and the provision of a construction which can without difficulty be shifted for use as an ordinary link and pin coupling. One embodiment of the invention is illustrated in the accompanying drawings, wherein:—

Figures 1 and 2 are sectional views through the coupler, Fig. 1 being a horizontal section and Fig. 2 a section at right angles thereto.

As shown in Figs. 1 and 2, the body of the coupler comprises preferably a casting having a hollow shank 1 and a hollow transversely extending head 2. The shank may be of any shape desired and may be secured to the car framing in the ordinary or any desired way. The head 2 is provided in its front face with the slot 3, the head being hollowed out so that the portions adjacent the slot constitute over-hanging lips or ledges 4 and 5 as indicated in Fig. 2. Lying in the slot 3 and free to move laterally therein is the coupling link 6. A bearing pin 7 engages the inner end of the link 6 and mounted removably on the ends of the pin are the rollers 8 and 9. These rollers are of such thickness that they may be inserted through the slot 3 in assembling the parts. In order to get the pin 7 in position in the link and rollers, the perforation 10 is provided in the top wall of the head, a perforation 11 of smaller diameter than the pin 7 being provided in the lower wall of the head in order to permit of the insertion of a tool to drive out the pin 7 when desired. A coupling pin 12 normally occupies the perforations 10 and 11 as indicated in Fig. 2. Another pair of perforations 13 and 14 are provided for receiving the coupling pin 10 in case the pin 7 and its rollers are broken, or for any reason it becomes desirable to connect the link 6 to the head 2 in the ordinary way.

An inspection of Fig. 1 indicates the increased range afforded by the use of the pin 7 and its roller, the dotted lines indicating the lateral extreme to which the link may be moved without bending or straining the parts. The rollers are desirable as compared with non-rotatable bearing members inasmuch as the friction in moving laterally is reduced and any tendency of the bearing pin and parts carried thereby to stick in any particular portion of the head is eliminated. The rollers are of such diameter that the pin 7 can never be brought far enough forward to drop through the opening 13. The apparatus has the advantage that it can be used interchangeably with the ordinary pin and link coupler and in any place in which such coupler can be used, and if desired can, without difficulty be transformed into the ordinary coupler by removing the pin 7 and its rollers and utilizing the coupler pin 12. Other advantages incident to the construction will be apparent to those skilled in the art.

Having thus described my invention and illustrated its use, what I claim as new and desire to secure by Letters Patent is the following:—

1. In combination, a casting consisting of a shank and a hollow transversely extending head slotted along its front side and provided with opposing overhanging lips, a vertical pin in the head, bearing members carried removably on the ends of the pin and engaging the overhanging lips, and a coupling link lying between the bearing members and engaging the pin, the slot in the head being wide enough to permit the insertion therethrough of the bearing members, and the upper wall of the head being perforated to receive the said pin.

2. In combination, a hollow transversely extending head slotted along its front side and provided with opposing overhanging lips, a vertical pin in the head, bearing rollers carried removably on the ends of the pin and engaging the overhanging lips, and a coupling link lying between the bearing rollers and engaging the pin, the upper face of the head being perforated to permit of the insertion of the pin into the head and through the rollers.

3. In combination, a hollow transversely extending head slotted along its front side and provided with opposing overhanging lips, a vertical pin in the head, bearing rollers carried removably on the ends of the pin and engaging the overhanging lips, and a coupling link lying between the bearing rollers and engaging the pin, the upper face of the head being perforated to permit of the insertion of the pin into the head and through the rollers, and the lower face of the head being also provided with a perforation on alinement with the other perforation.

4. In combination, a hollow transversely extending head slotted along its front side and provided with opposing overhanging lips, a vertical pin in the head, bearing rollers carried removably on the ends of the pin and engaging the overhanging lips, and a coupling link lying between the bearing rollers and engaging the pin, the upper face of the head being perforated to permit of the insertion of the pin into the head and through the rollers, the rear end of the head being provided with a pair of perforations in alinement to permit of the insertion and removal of the said pin, and the front end of the head being provided with a pair of perforations in alinement adapted to receive a coupling pin.

5. In combination, a hollow transversely extending head having a bottom wall, and at its front edge a pair of opposing lips with a slot therebetween, a vertical pin in the head to the rear of the said lips, bearing rollers carried on the ends of the pin with their edges engaging the said lips, and a coupling link lying in the slot and between the bearing rollers and encircling the said pin, the said pin and rollers being supported upon the said bottom wall, and an opening being provided in the head above the rollers and pin to permit of the assemblage of the parts in the head.

In testimony whereof I have hereunto signed my name in the presence of the two subscribed witnesses.

CHARLES C. HOGEN.

Witnesses:
  GEORGE WEYMARK,
  WM. W. FIELD.

---

Copies of this patent may be obtained for five cents each, by addressing the "Commissioner of Patents, Washington, D. C."